US010003775B2

(12) United States Patent
Miyazaki

(10) Patent No.: US 10,003,775 B2
(45) Date of Patent: *Jun. 19, 2018

(54) LUMINESCENT WHEEL, LIGHT SOURCE UNIT HAVING LUMINESCENT WHEEL DEVICE INCLUDING SAME LUMINESCENT WHEEL, AND PROJECTOR

(71) Applicant: CASIO COMPUTER CO., LTD., Shibuya-ku, Tokyo (JP)

(72) Inventor: Takeshi Miyazaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/585,283

(22) Filed: May 3, 2017

(65) Prior Publication Data

US 2017/0237952 A1    Aug. 17, 2017

Related U.S. Application Data

(63) Continuation of application No. 14/841,591, filed on Aug. 31, 2015, now Pat. No. 9,681,110.

(30) Foreign Application Priority Data

Sep. 8, 2014    (JP) .................................. 2014-182295

(51) Int. Cl.
| | |
|---|---|
| *H04N 9/31* | (2006.01) |
| *G02B 26/00* | (2006.01) |
| *G03B 21/20* | (2006.01) |
| *F21K 9/64* | (2016.01) |
| *F21Y 115/30* | (2016.01) |

(52) U.S. Cl.
CPC .............. *H04N 9/3111* (2013.01); *F21K 9/64* (2016.08); *G02B 26/008* (2013.01); *G03B 21/204* (2013.01); *H04N 9/3144* (2013.01); *H04N 9/3155* (2013.01); *H04N 9/3158* (2013.01);
(Continued)

(58) Field of Classification Search
CPC ................ G03B 21/005; G03B 21/204; G03B 21/2013; G03B 21/2033; G03B 21/2053
See application file for complete search history.

(56) References Cited

U.S. PATENT DOCUMENTS

| | | |
|---|---|---|
| 2011/0205502 A1 | 8/2011 | Kato et al. |
| 2012/0044465 A1 | 2/2012 | Murai et al. |

(Continued)

FOREIGN PATENT DOCUMENTS

| | | |
|---|---|---|
| JP | 2011070882 A | 4/2011 |
| JP | 2012037681 A | 2/2012 |

OTHER PUBLICATIONS

Chinese Office Action (and English translation thereof) dated Oct. 27, 2016, issued in counterpart Chinese Application No. 201510565982.3.

*Primary Examiner* — Sultan Chowdhury
(74) *Attorney, Agent, or Firm* — Holtz, Holtz & Volek PC

(57) ABSTRACT

A luminescent wheel includes a reflecting plate on which a diffuse plate and a luminescent material layer are provided in an end-to-end relationship with each other in a circumferential direction, a first supporting plate which is provided on one surface of the reflecting plate to support part of the diffuse plate, and a second supporting plate which is provided on the other surface of the reflecting plate to support part of the diffuse plate.

18 Claims, 9 Drawing Sheets

(52) U.S. Cl.
CPC ......... *H04N 9/3161* (2013.01); *H04N 9/3164* (2013.01); *F21Y 2115/30* (2016.08)

(56) References Cited

U.S. PATENT DOCUMENTS

| | | |
|---|---|---|
| 2012/0133903 A1 | 5/2012 | Tanaka et al. |
| 2012/0147331 A1 | 6/2012 | Miyazaki et al. |
| 2013/0021582 A1 | 1/2013 | Fujita et al. |
| 2014/0063082 A1 | 3/2014 | Masuda et al. |
| 2014/0198301 A1* | 7/2014 | Yagyu ................. H04N 9/3158 353/31 |
| 2015/0167907 A1* | 6/2015 | Hoehmann ........... G03B 21/204 362/84 |
| 2016/0062220 A1* | 3/2016 | Kato .................. G03B 21/2013 353/31 |
| 2016/0170199 A1* | 6/2016 | Inoue .................... G03B 21/14 348/761 |

\* cited by examiner

LUMINESCENT WHEEL, LIGHT SOURCE UNIT HAVING LUMINESCENT WHEEL DEVICE INCLUDING SAME LUMINESCENT WHEEL, AND PROJECTOR

CROSS-REFERENCE TO RELATED APPLICATION

This patent application is a Continuation application of U.S. Ser. No. 14/841,591 filed on Aug. 31, 2015, which is based upon and claims the benefit of priority under 35 USC 119 from the prior Japanese Patent Application No. 2014-182295 filed on Sep. 8, 2014, the entire disclosure of both of which, including the description, claims, drawings and abstract, is incorporated herein by reference.

BACKGROUND OF THE INVENTION

Field of the Invention

The present invention relates to a luminescent wheel, a light source unit having a luminescent wheel device including the luminescent wheel, and a projector including this light source unit.

Description of the Related Art

In these days, data projectors are used on many occasions as an image projection system which projects an image of a screen or a video image of a personal computer, as well as images based on image data which is stored on a memory card or the like on to a screen. In these data projectors, light emitted from a light source is caused to converge to a micromirror display device called a DMD (Digital Micromirror Device) or a liquid crystal panel so that a full-color image is displayed onto a screen.

In addition, the application of such projectors is expanding widely from commercial presentation to domestic use as video equipment including personal computers, DVD players and the like has been used generally. Conventionally, the mainstream of these projectors has been those which utilize a high-intensity discharge lamp as a light source. In recent years, however, there have been made various developments of projectors which use, as a light source, a plurality of semiconductor light emitting elements such as laser diodes and which include a luminescent wheel which uses the semiconductor light emitting elements as excitation light sources.

A projector disclosed in the Japanese Unexamined Patent Publication No. 2012-37681 includes a red light source device and a luminescent wheel device. The luminescent wheel device has a luminescent wheel having a luminescent material layer on to which light in the blue wavelength range which is emitted from an excitation light shining device is shone as excitation light to thereby emit luminescent light in the green wavelength rage and a diffuse transmission area which diffuses and transmits light emitted from the excitation light shining device. The excitation light shining device also functions as a blue light source since light emitted therefrom is diffused and transmitted through the diffuse transmission area of the luminescent wheel.

In the luminescent wheel of the luminescent wheel device which is disclosed in the Japanese Unexamined Patent Publication No. 2012-37681, an arc-shaped cut-out portion is cut in a disc-shaped metallic base, and a diffuse plate is provided in this cut-out portion. This luminescent wheel has the luminescent material layer which is provided in an end-to-end relationship with the diffuse plate in a circumferential direction, and the luminescent material layer is provided in an annular recess portion provided on the mirror finished base. Because of this, it is difficult to machine the metallic base to provide the annular recess portion, and a certain length of machining time is required. Further, the metallic base needs to have a predetermined thickness for forming the annular recess portion. This makes it difficult to form the cut-out portion through punching by using a press, and therefore, the cut-out portion is required to be formed through cutting. It is considered that forming the cut-out portion through cutting takes a certain length of time.

In recent years, a luminescent wheel 501 shown in FIG. 9 is used as a luminescent wheel in which the aforesaid problem with machining the metallic base is improved. In this luminescent wheel 501, a C-shaped partially annular luminescent material layer 502 is provided on a front side of a reflecting plate 510. A first diffuse plate supporting plate 530 is provided on a back side of the reflecting plate 510 so as to support a diffuse plate 520. The diffuse plate 520 is fastened by claw portions 533 which are provided at both ends of a cut-out portion in the first diffuse plate supporting plate 530 so as not to come off in a direction in which a centrifugal force is applied when the luminescent wheel 501 rotates.

Further, a second diffuse plate supporting plate 540 is provided on a back side of the first diffuse plate supporting plate 530. Additionally, a front side of the diffuse plate 520 near an inner circumferential edge 522 thereof is superposed on a back surface of the reflecting plate 510 near an inner circumferential edge 512 of a cut-out portion in the reflecting plate 510. On the other hand, a back side of the diffuse plate 520 near the inner circumferential edge 522 thereof is superposed on a front side of an inner circumferential edge 542 of a cut-out portion in the second diffuse plate supporting plate 540. In this way, the diffuse plate 520 is held by the reflecting plate 510 and the second diffuse plate supporting plate 540 to be fixed to the luminescent wheel 501.

Since the reflecting plate 510, the first diffuse plate supporting plate 530 and the second diffuse plate supporting plate 540 of the luminescent wheel 501 shown in FIG. 9 are each formed of a thin metallic plate, the cut-out portions and the like can be machined through punching. Further, since the luminescent wheel 501 is formed by combining these disc-shaped thin plate materials together, the fabricating work becomes easy.

However, the luminescent wheel 501 shown in FIG. 9 is configured as the four-layer construction of the first diffuse plate supporting plate 530, the second diffuse plate supporting plate 540, the reflecting plate 510 and the luminescent layer 502, and therefore, the thickness of the luminescent wheel 501 is increased, thereby calling for an enlargement in size of the luminescent wheel 501. Although it is considered to reduce the respective thicknesses of those constituent members, it is required that the reflecting plate 501 has a predetermined thickness so as to be prevented from being thermally deformed when the reflecting plate 501 is mirror finished. Additionally, since the first diffuse plate supporting plate 530 fastens the diffuse plate 520 with the claw portions 533 in relation to the direction in which the centrifugal force is applied, the predetermined thickness is required.

SUMMARY OF THE INVENTION

Thus, the invention has been made in view of these situations, and an object thereof is to provide a luminescent wheel whose thickness is reduced, a light source unit which can be reduced in size by including the luminescent wheel, and a projector including the light source unit.

According to an aspect of the invention, there is provided a luminescent wheel including:

a reflecting plate on which a diffuse plate and a luminescent material layer are provided in an end-to-end relationship with each other in a circumferential direction;

a first supporting plate which is provided on one surface of the reflecting plate to support part of the diffuse plate; and a second supporting plate which is provided on the other surface of the reflecting plate to support part of the diffuse plate; wherein the luminescent material layer is formed on the reflecting plate.

According to another aspect of the invention, there is provided a light source unit including:

a luminescent wheel device including the luminescent wheel according to the invention;

an excitation light shining device which is made up of a semiconductor light emitting element to emit light in the blue wavelength range as excitation light; and a red light source device which is made up of a semiconductor light emitting device to emit light in the red wavelength range, wherein the luminescent material layer emits light in the green wavelength range as a result of the excitation light being shone on thereto.

According to a further aspect of the invention, there is provided a projector including:

the light source unit according to the aforesaid aspect of the invention;

a display device on to which light source from the light source unit is shone to form image light;

a projection side optical system which projects the image light emitted from the display device on to a screen; and a projector control unit configured to control the display device and the light source unit.

BRIEF DESCRIPTION OF THE SEVERAL VIEWS OF DRAWINGS

DETAILED DESCRIPTION OF THE PREFERRED EMBODIMENTS

Hereinafter, a best mode for carrying out the invention will be described through the use of the accompanying drawings. It should be noted, however, that although the following embodiment includes various limitations which are technically preferable to carry out the invention, the scope of the invention will not be limited to the following embodiment and illustrated examples.

Figure 1:
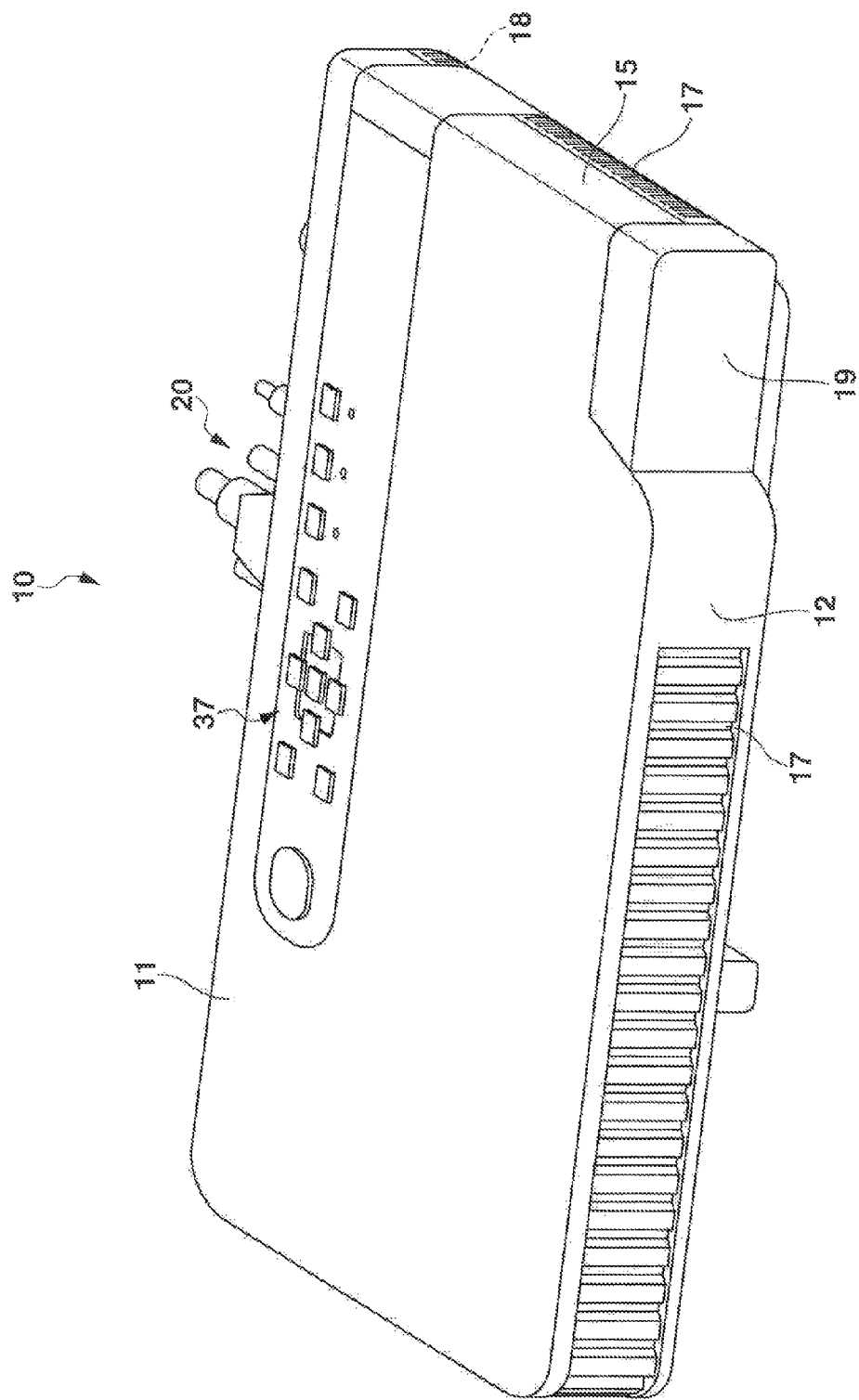
FIG. 1 is an external perspective view showing a projector according to an embodiment of the invention.

Hereinafter, an embodiment of the invention will be described through the use of the accompanying drawings. FIG. 1 is an external perspective view of a projector 10. In this embodiment, when left and right are referred to in relation to the projector 10, they denote, respectively, left and right with respect to a projecting direction, and when front and rear are referred to in relation to the projector 10, they denote, respectively, front and rear with respect to a direction towards a screen from the projector 10 and a traveling direction of a pencil of light emitted from the projector 10.

As shown in FIG. 1, the projector 10 has a substantially rectangular parallelepiped shape. The projector 10 has a projection port to a side of a front panel 12 that is a front side panel of a casing of the projector 10, and this projection port is covered by a lens cover 19. A plurality of inside air outlet ports 17 are provided in the front panel 12. Further, although not shown, the projector 10 has an Ir reception unit which receives a control signal from a remote controller.

In addition, a keys/indicators unit 37 is provided on an upper panel 11 of the casing. Disposed on this keys/indicators unit 37 are keys and indicators which include a power indicator, a projection switch key, an overheat indicator, and the like. The power indicator informs whether a power switch key or a power supply is on or off. The projection switch key switches on and off the projection by the projector 10. The overheat indicator informs of an overheat condition occurring in a light source unit, a display device, a control unit or the like when they really overheat.

Further, an input/output connector unit where USB terminals, an image signal input D-SUB terminal where analog RGB image signals are inputted, an S terminal, an RCA terminal, a voice output terminal and the like are provided and (a group of) various types of terminals 20 including a power supply adaptor plug are provided on a back panel 13 at the rear of the casing. Additionally, a plurality of outside air inlet ports are formed in the back panel 13. Additionally, a plurality of inside air outlet ports 17 are formed in each of a right side panel, not shown, which is a side panel of the casing, a left side panel 15 which is a side panel shown in FIG. 1 and the front panel 12. Outside air inlet ports 18 are also formed in a corner portion between the left side panel 15 and the back panel 13.

Figure 2:
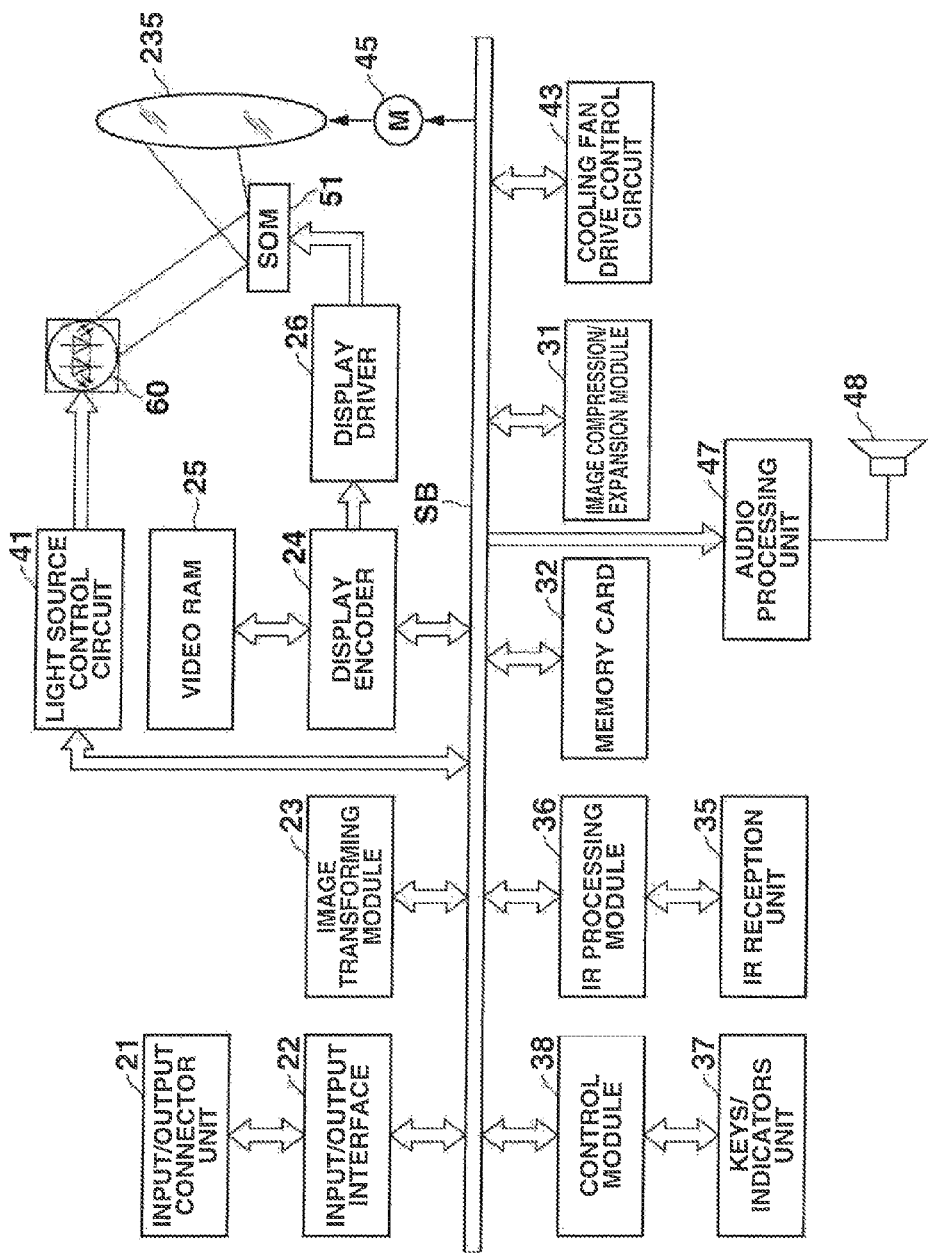
FIG. 2 is a functional block diagram of the projector according to the embodiment of the invention.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like.

This control module 38 governs the control of operations of circuitries within the projector 10 and is made up of a CPU, a ROM which stores in a fixed fashion operation programs of various types of settings, a RAM which is used as a working memory, and the like.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate in response to the output of the image signal from the display encoder 24. In this projector 10, a pencil of light that is emitted from a light source unit 60 is shone on to the display device 51 via a light source side optical system, which will be described later, whereby an optical image is formed by using reflected light reflected by the display device 51. The image so formed is then projected on to a screen, not shown, for display thereon via a projection side optical system. A movable lens group 235 of the projection side optical system is driven by a lens motor 45 for zooming or focusing.

An image compression/expansion module 31 performs a recording process of data compressing a brightness signal and a color difference signal of the image signal to be sequentially written on a memory card 32 that is a detachable recording medium through operations using ADCT and the Huffman method.

Further, when in a reproducing mode, the image compression/expansion module 31 reads out the image data recorded on the memory card 32 and expands individual image data that make up a series of dynamic images frame by frame. Then, the image compression/expansion module 31 outputs the image data to the display encoder 24 via the image transforming module 23 so as to enable the display of dynamic images and the like based on the image data stored on the memory card 32.

Operation signals generated at the keys/indicators unit 37 that includes the main keys and indicators that are provided on the upper panel 11 of the casing are sent out directly to the control module 38. Key operation signals from the remote controller are received by the Ir reception unit 35, and code signals are demodulated by an Ir processing module 36 to be outputted to the control module 38.

An audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 which is configured as a light source control unit. This light source control circuit 41 controls separately and individually an excitation light source and a red light source device to emit lights in the red, green and blue wavelength ranges at predetermined timings so that the lights in the predetermined wavelength ranges which are required when an image is generated are emitted from the light source unit 60.

Further, the control module 38 causes a cooling fan drive control circuit 43 to detect temperatures through a plurality of temperature sensors which are provided in the light source unit 60 and the like so as to control the rotating speeds of cooling fans based on the results of the temperature detections. The control module 38 also controls the cooling fan drive control circuit 43 so that the cooling fans continue to rotate even after the power supply to the projector 10 itself is turned off through the use of a timer or the power supply to the projector 10 itself is turned off depending upon the results of the temperature detections by the temperature sensors.

Figure 3:
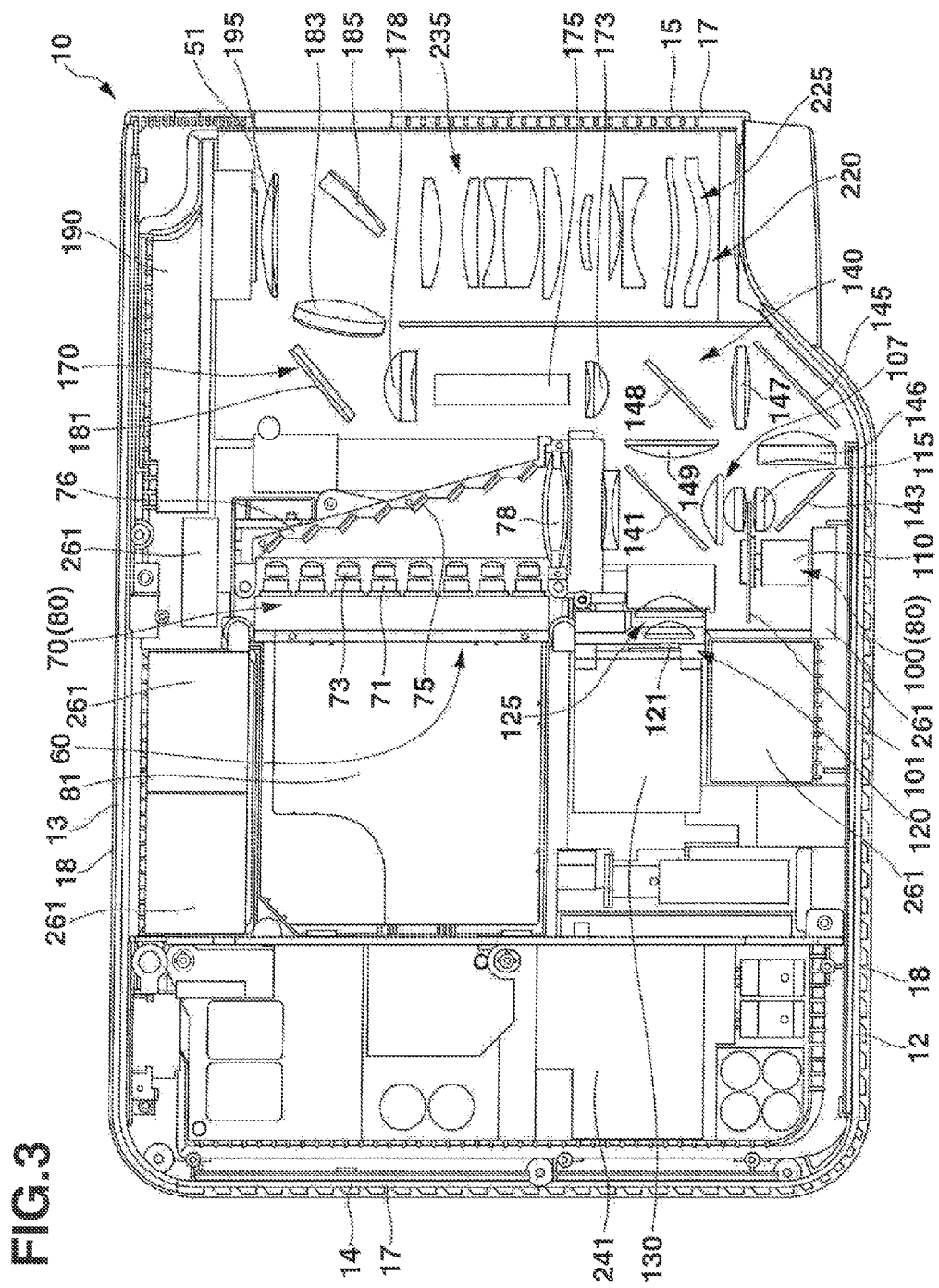
FIG. 3 is a schematic plan view showing an internal construction of the projector according to the embodiment of the invention.

Next, an internal construction of the projector 10 will be described based on what is shown in FIG. 3. FIG. 3 is a schematic plan view showing the internal construction of the projector 10. The projector 10 includes a control circuit board 241 near the right side panel 14. The control circuit board 241 includes a power supply circuit block, a light source control block and the like. The projector 10 includes the light source unit 60 to a side of the control circuit board 241, that is, in a substantially central portion of the casing of the projector 10. Further, the projector 10 includes a light source side optical system 170 and a projection side optical system 220 which are disposed between the light source unit 60 and the left side panel 15.

The light source unit 60 includes a red light source device 120 which is a light source of light in the red wavelength range, an excitation light shining device 70 which functions not only as a blue light source device which is a light source of light in the blue wavelength range but also as an excitation light source, and a green light source 80 which is a light source of light in the green wavelength range. The green light source device 80 is made up of the excitation light shining device 70, and a luminescent wheel device 100. Additionally, a light guiding optical system 140 is disposed in the light source unit 60, and this light guiding optical system 140 guides and emits lights in the red, green and blue wavelength ranges. The light guiding optical system 140 collects lights in the red, green and blue wavelength ranges which are emitted from the red, green and blue light sources, respectively, to an entrance port of a light tunnel 175.

The excitation light shining device 70, which is the excitation light source making up the green light source device 80, is disposed at a substantially central portion in a left-to-right direction of the casing of the projector 10 and near the back panel 13. The excitation light shining device 70 includes alight source group, a reflecting mirror group 75, a collective lens 78 and a heat sink 81. The light source group includes blue laser diodes 71 which are a plurality of semiconductor devices which are disposed so that their optical axes are parallel to the back panel 13. The reflecting mirror group 75 changes the direction of axes of lights emitted from the blue laser diodes 71 by 90 degrees in the direction of the front panel 12. The collective lens 78 collects lights emitted from the blue laser diodes 71 and reflected by the reflecting mirror group 75. The heat sink 81 is disposed between the blue laser diodes 71 and the right side panel 14.

In the light source group, the blue laser diodes 71 are arranged into a matrix configuration. Collimator lenses 73 are disposed individually on the optical axes of the blue laser diodes 71, and these collimator lenses 73 convert lights emitted from the blue laser diodes 71 into parallel beams so as to enhance the directivity thereof. The reflecting mirror group 75 is configured so that a plurality of reflecting mirrors are arranged like steps of a staircase and are integrated with a mirror substrate 76 so as to adjust the position thereof, whereby sectional areas of pencils of light emitted from the blue laser diodes 71 are reduced in one direction for emission to the collective lens 78.

A cooling fan 261 is disposed between the heat sink 81 and the back panel 13, so that the blue laser diodes 71 are cooled by this cooling fan 261 and the heat sink 81. Further, a cooling fan 261 is also disposed between the reflecting mirror group 75 and the back panel 13, so that the reflecting mirror group 75 and the collective lens 78 are cooled by this cooling fan 261.

The red light source device 120 includes a red light source 121 which is disposed so that an optical axis thereof becomes parallel to the blue laser diodes 71 and a collective lens group 125 which collects light emitted from the red light source 121. This red light source 121 is a red light emitting diode which is a semiconductor light emitting element which emits light in the red wavelength range. Then, the red light source device 120 is disposed so that the axis of light in the red wavelength range which is emitted from the red light source device 120 intersects light in the blue wavelength range which is emitted from the excitation light shining device 70 and light in the green wavelength range which is emitted from a luminescent wheel 101.

Further, the red light source device 120 includes a heat sink 130 which is disposed on a side of the red light source 121 which faces the right side panel 14. A cooling fan 261 is disposed between the heat sink 130 and the front panel 12, so that the red light source 121 is cooled by the cooling fan 261 and the heat sink 130.

The luminescent wheel device 100 includes the luminescent wheel 101, a wheel motor 110, a collective lens group 107, and a collective lens 115. The luminescent wheel 101 is disposed so as to be parallel to the front panel 12, that is, so as to be at right angles to an axis of light emitted from the excitation light shining device 70. The wheel motor 110 drives to rotate the luminescent wheel 101. The collective lens group 107 not only collects a pencil of excitation light emitted from the excitation light shining device 70 to the luminescent wheel 101 but also collects a pencil of light which is emitted from the luminescent wheel 101 in the direction of the back panel 13. The collective lens 115 collects a pencil of light which is emitted from the luminescent wheel 101 in the direction of the front panel 12. Additionally, a cooling fan 261 is disposed between the wheel motor 110 and the front panel 12, so that the luminescent wheel device 100 is cooled by this cooling fan 261.

The luminescent wheel 101 includes a luminescent light emitting area which emits luminescent light and a diffuse transmission area where incident light is diffused. A luminescent material layer on the luminescent light emitting area of the luminescent wheel 101 is formed of a green luminescent material. Consequently, when light in the blue wavelength range from the excitation light shining device 70 is shone on to this luminescent material layer as excitation light, the green luminescent material is excited, whereby light in the green wavelength range is emitted in every direction from the green luminescent material. A pencil of light which is produced in a luminescent fashion is emitted to a front side of the luminescent wheel 101 (in other words, a side of the luminescent wheel 101 which faces the back panel 13) to be incident on the collective lens group 107. On the other hand, light in the blue wavelength range which is emitted from the excitation light shining device 70 to be incident on the diffuse transmission area of the luminescent wheel 101 passes through the luminescent wheel 101 while being diffused by the luminescent wheel 101 to be incident on the collective lens 115 which is disposed on a back side of the luminescent wheel 101 (in other words, aside of the luminescent wheel 101 which faces the front panel 12).

The light guiding optical system 140 includes a collective lens which collects pencils of light in the red, green and blue wavelength ranges, as well as reflecting mirrors and dichroic mirrors which change the directions of axes of the red, green and blue lights so that the red, green and blue lights are directed in the same direction. Specifically, in the light guiding optical system 140, a first dichroic mirror 141 is disposed in a position where the axes of light in the blue wavelength range which is emitted from the excitation light shining device 70 and light in the green wavelength range which is emitted from the luminescent plate 101 intersect the axis of light in the red wavelength range which is emitted from the red light source device 120. This first dichroic mirror 141 transmits excitation light in the blue wavelength range and light in the red wavelength range and reflects light in the green wavelength range so that the direction of the axis of the light in the green wavelength range is changed by 90 degrees in the direction of the left side panel 15.

A first reflecting mirror 143 is disposed on an axis of light in the blue wavelength range which passes through the luminescent wheel 101 while being diffused, that is, between the collective lens 115 and the front panel 12, and this first reflecting mirror 143 reflects light in the blue wavelength range so that the direction of the axis of the blue light is changed by 90 degrees in the direction of the left panel 15. A collective lens 146 is disposed on a side of the first reflecting mirror 143 which faces the left side panel 15, and a second reflecting mirror 145 is disposed on a side of the collective lens 146 which faces the left side panel 15. A collective lens 147 is disposed on a side of the second reflecting mirror 145 which faces the back panel 13. The second reflecting mirror 145 changes the direction of an axis of light in the blue wavelength range, which is reflected by the first reflecting mirror 143 to be incident thereon via the collective lens 146, by 90 degrees in the direction of the back panel 13.

A collective lens 149 is disposed on a side of the first dichroic mirror 141 which faces the left side panel 15. Further, a second dichroic mirror 148 is disposed on a side of the collective lens 149 which faces the left side panel 15 or on a side of the collective lens 147 which faces the back panel 13. The second dichroic mirror 148 reflects light in the red wavelength range and light in the green wavelength range to change the direction of the axes of the red and green lights by 90 degrees in the direction of the back panel 13 and transmits light in the blue wavelength range.

The axis of light in the red wavelength range which passes through the first dichroic mirror 141 is caused to coincide with the axis of light in the green wavelength range which is reflected by the first dichroic mirror 141. Consequently, the light in the red wavelength range which passes through the first dichroic mirror 141 and the light in the green wavelength range which is reflected by the first dichroic mirror 141 are both incident on the collective lens 149. Then, the light in the red wavelength range and the light in the green wavelength range which pass through the collective lens 149 are reflected by the second dichroic mirror 148 and are then collected to the entrance port of the light tunnel 175 via the collective lens 173 of the light source side optical system 170. On the other hand, light in the blue wavelength range which passes through the collective lens 147 passes through the second dichroic mirror 148 and is then collected to the entrance port of the light tunnel 175 via the collective lens 173.

The light source side optical system 170 includes the collective lens 173, the light tunnel 175, a collective lens 178, a light axis changing mirror 181, a collective lens 183, a light shining mirror 185 and a condenser lens 195. The condenser lens 195 emits image light, which is emitted from the display device 51 which is disposed on a side of the condenser lens 195 which faces the back panel 13, towards the projection side optical system 220, and therefore, the condenser lens 195 is also understood to be part of the projection side optical system 220.

The collective lens 173 is disposed near the light tunnel 175, and this collective lens 173 collects light source light to the entrance port of the light tunnel 175. Thus, light in the red wavelength range, light in the green wavelength range and light in the blue wavelength range are collected by the collective lens 173 to be incident on the light tunnel 175. Pencils of light which are incident on the light tunnel 175 are distributed uniformly in terms of intensity by the light tunnel 175.

The light axis changing mirror 181 is disposed subsequent to the collective lens 178 on an optical axis of the light tunnel 175 on a side the light tunnel 175 which faces the back panel 13. The pencils of light which exit from an exit port of the light tunnel 175 are collected by the collective lens 178, whereafter the direction of axes of the pencils of light is changed in the direction of the left side panel 15 by the light axis changing mirror 181.

The pencils of light which are reflected by the light axis changing mirror 181 are collected by the collective lens 183 and are then shone onto the display device 51 at a predetermined angle via the condenser lens 195 by the shining mirror 185. A heat sink 190 is provided on a side of the display device 51 which faces the back panel 13, so that the display device 51 which is a DMD is cooled by this heat sink 190.

The pencils of light, which are light source lights, shone on to the display device 51 by the light source side optical system 170 are reflected on image forming surfaces of the display device 51 and are then projected on to a screen via the projection side optical system 220 as projection light. Here, the projection side optical system 220 includes the condenser lens 195, the movable lens group 235, and a fixed lens group 225. The fixed lens group 225 is incorporated in a fixed lens barrel. The movable lens group 235 is incorporated in a movable lens barrel so as to be moved by the lens motor for zooming and focusing adjustments.

By configuring the projector 10 in the way described heretofore, when the luminescent wheel 101 is rotated and lights are emitted from the excitation light shining device 70 and the red light source device 120 at different timings, lights in the red, green and blue wavelength ranges are sequentially incident on the collective lens 173 and the light tunnel 175 via the light guiding optical system 140 and are then incident on the display device 51 via the light source side optical system 170. Then, the DMD, which is the display device 51 of the projector 10, displays the red, green and blue lights in a time sharing fashion according to data, whereby a color image can be projected on to the screen.

Figure 4:
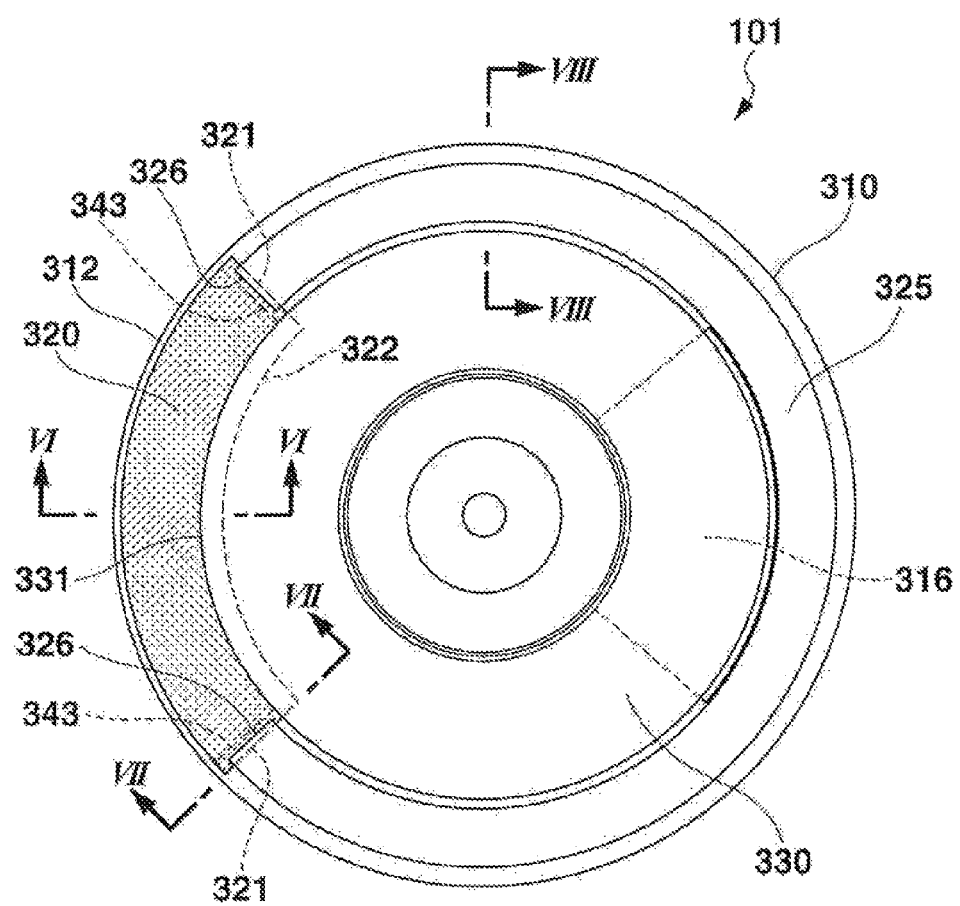
FIG. 4 is a front view of a luminescent wheel according to the embodiment of the invention.
Figure 5:
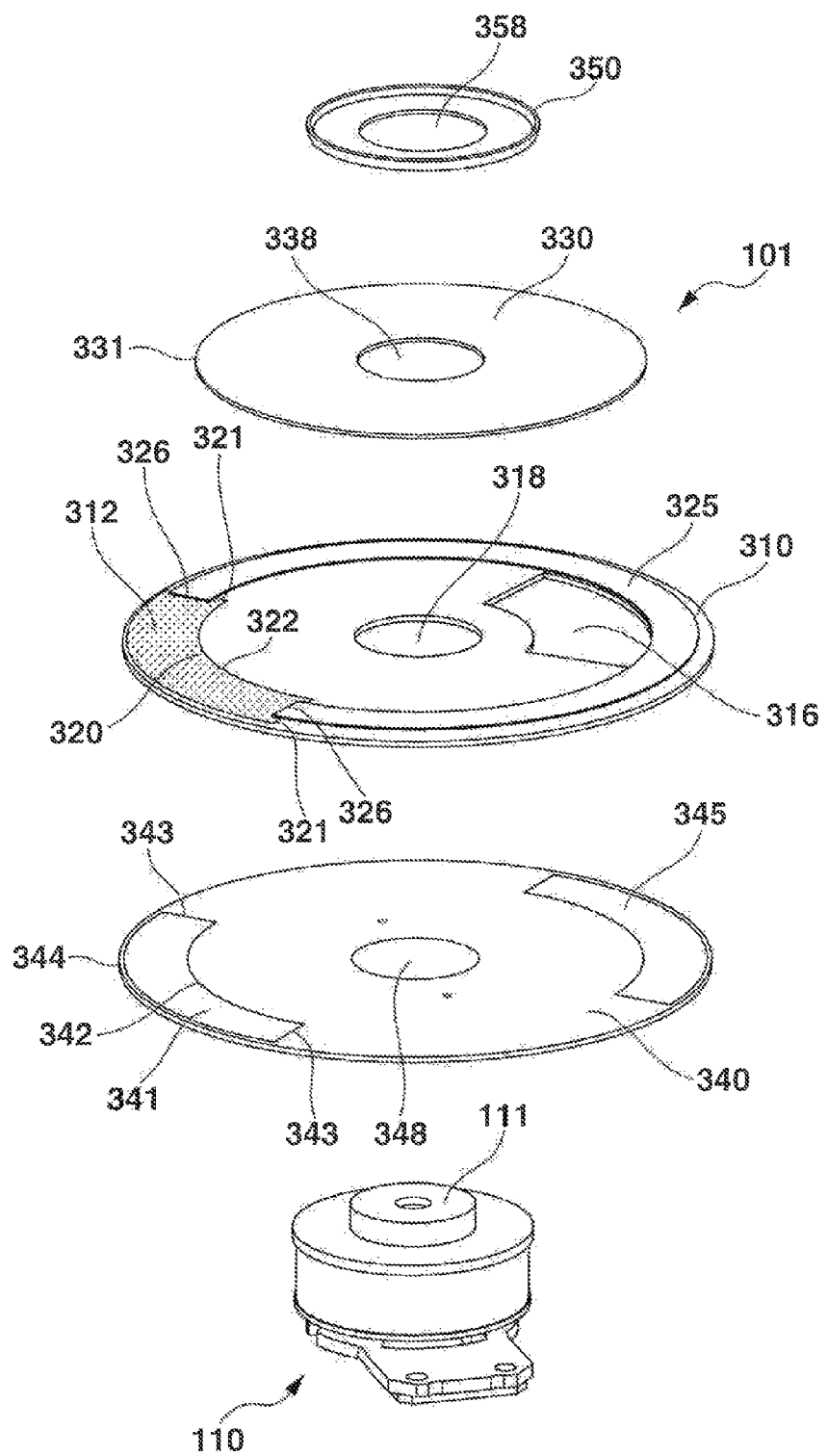
FIG. 5 is an exploded perspective view of the luminescent wheel according to the embodiment of the invention.

Next, the configuration of the luminescent wheel 101 according to the embodiment will be described in greater detail. FIG. 4 is a front view of the luminescent wheel 101. FIG. 5 is an exploded perspective view of the luminescent wheel 101. A reflecting plate 310, which is formed into a disc shape, is provided on the luminescent wheel 101. The reflecting plate 310 is formed by mirror finishing a surface of a metallic base made up of copper, aluminum or the like through silver deposition or the like.

A diffuse plate hole portion 312 is provided so as to be opened in the reflecting plate 310, and this diffuse plate hole portion 312 has an arc shape which is concentric with an outer circumference of the reflecting plate 310. A diffuse plate 320 is inserted in the diffuse plate hole portion 312, and this diffuse plate 320 is formed so as to match the arc shape of the diffuse plate hole portion 312. The diffuse plate 320 is formed of a transparent material such as glass, and fine irregularities are formed on a surface of the diffuse plate 320 through sandblasting. Thus, a laser beam emitted from the excitation light shining device 70 is diffused at a predetermined diffusing angle by being caused to pass through the diffuse plate 320.

A luminescent material layer 325 is provided on a front surface of the reflecting plate 310 in an end-to-end relationship with the diffuse plate 320 in a circumferential direction, and this luminescent material layer 325 has a C-like annular shape which is concentric with the reflecting plate 310. This luminescent material layer 325 is formed by mixing a green luminescent material uniformly into a binder of a highly transparent silicone resin or the like and forming the resulting mixture into a layer. Consequently, when light emitted from the excitation light shining device 70 is shone on to the luminescent material layer 325 as excitation light, the luminescent material layer 325 emits luminescent light in the green wavelength range. Then, pencils of light emitted in a luminescent fashion in every direction from the green luminescent material in the green luminescent material layer 325 are emitted directly towards the excitation light shining device 70 or are emitted indirectly towards the excitation light shining device 70 after having been reflected on a reflecting surface of the reflecting plate 310.

Additionally, two end edges 326 of the luminescent material layer 325 are situated on the diffuse plate 320. Namely, end portions of the luminescent material layer 325 are provided so as to overlap the diffuse plate 320 in such a way as to be situated thereon. Consequently, joints between circumferential end edges 321 of the diffuse plate 320 and the diffuse plate 312 are covered by the luminescent material layer 325.

An opening portion 316 is formed in the reflecting plate 310 on an opposite side to a side where the diffuse plate hole portion 312 is formed. The opening portion 316 is opened so as to correspond to the position and size of the diffuse plate hole portion 312 to balance the reflecting plate 310 when the reflecting plate 310 is rotated.

A front side supporting plate (a first supporting plate) 330 is provided on a front side of the reflecting plate 310, and this front side supporting plate 330 has a circular disc shape and is formed of a metal such as an aluminum material. An outer circumferential edge 331 of the front side supporting plate 330 extends further radially outwards than an inner circumferential edge 322 of the diffuse plate 320. Consequently, a front surface of the diffuse plate 320 lying near the inner circumferential edge 322 thereof is supported by the front side supporting plate 330 while overlapping the diffuse plate 320 on a radially inner side of the reflecting plate 310.

A back side supporting plate (a second supporting plate) 340 is provided on a back side of the reflecting plate 310, and this back side supporting plate 340 has a circular disc shape and is formed of a metal such as a stainless steel material. Two transmitting portions 341, 345 are formed in the back side supporting plate 340. The transmitting portions 341, 345 are each opened into an arc shape which is concentric with the back side supporting plate 340. The one transmitting portion 341 is provided so as to correspond to the diffuse plate 320, and the other transmitting portion 345 is formed on an opposite side to a side where the one transmitting portion 341 is formed. In this way, the two transmitting portions 341 and 345 which have the same shape are provided in the back side supporting plate 340 so as to balance the back side supporting plate 340 when it is rotated. Then, light which passes through the diffuse plate 320 passes through the transmitting portion 341.

A radius of curvature of an inner circumferential edge 342 of the transmitting portion 341 is the same as a radius of curvature of an outer circumferential edge 331 of the front side supporting plate 330, whereby the inner circumferential edge 342 follows the outer circumferential edge 331. Namely, the inner circumferential edge 342 is provided so as to extend further radially outwards than the inner circumferential edge 322 of the diffuse plate 320. Consequently, a back surface of the diffuse plate 320 which lies near the inner circumferential edge 322 thereof is supported by the back side while overlapping the diffuse plate 320.

Further, circumferential end edges 343 of the transmitting portion 341 are provided so as to lie further circumferentially inwards than the circumferential end edges 321 of the diffuse plate 320. Consequently, portions of the front surface of the back side supporting plate 340 which lie near the end edges 343 are brought into abutment with portions of the back surface of the diffuse plate 320 which lie near the end edges 321 thereof. Thus, both end portions of the diffuse plate 320 are supported by the back side supporting plate 340 from a back side of the luminescent wheel 101.

The wheel motor 110 is an outer-rotor-type motor. Mounting hole portions 318, 338, 348 of the reflecting plate 310, the front side supporting plate 330 and the back side supporting plate 340 are fitted on a shaft portion 111 of the wheel motor 110. A mounting hole portion 358 of a balance wheel 350 having a circular disc shape is fixed to the shaft portion 111 from the front side of the front side supporting plate 330, whereby the reflecting plate 310, the front side supporting plate 330 and the back side supporting plate 340 are connected to the wheel motor 110 to thereby be driven to rotate by the wheel motor 110. The rotating balance of the luminescent wheel 101 is finally adjusted by applying an adhesive or the like to an inner edge of the balance wheel 350 on a front side thereof.

Figure 6:
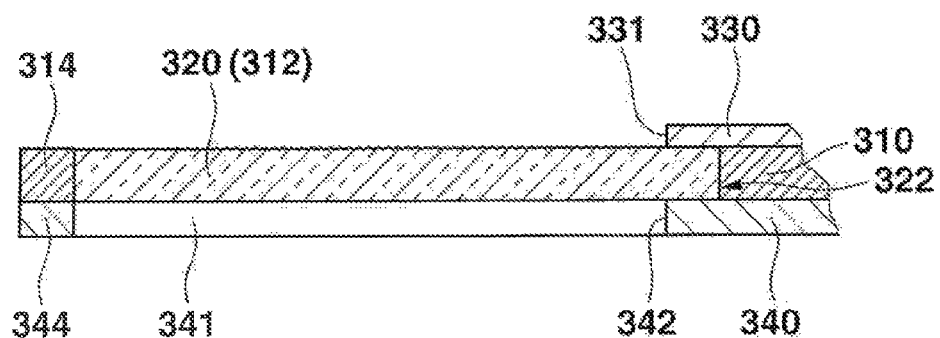
FIG. 6 is a sectional view of the luminescent wheel according to the embodiment of the invention taken along a line VI-VI in FIG. 4.

Next, FIG. 6 shows a sectional view of the luminescent wheel taken along a line VI-VI in FIG. 4. As has been described before, the portion of the diffuse plate 320 which lies near the inner circumferential edge 322 thereof is held by the portion of the front side supporting plate 330 which lies near the outer circumferential edge 331 thereof and the portion of the back side supporting plate 340 which lies near the inner circumferential edge 342 of the transmitting portion 341. Additionally, an outer circumferential frame 314 is formed outwards of the diffuse plate hole portion 312 or radially outwards of the diffuse plate 320. The diffuse plate 320 is fastened by this outer circumferential frame 314 in relation to a direction in which a centrifugal force is applied.

The circumferential end portions of the diffuse plate 320 can be exposed by means of the construction in which the diffuse plate 320 is fastened by the outer circumferential frame 314 in relation to the centrifugal direction thereof. Consequently, compared with the conventional luminescent wheel 501 shown in FIG. 9, since the area where the diffuse plate 320 is not used can be reduced, the utilization efficiency of the diffuse plate 320 can be increased. Similarly, an outer circumferential frame 344 is also formed outwards of the transmitting portion 314 of the back side supporting plate 340. Then, the outer circumferential frame 344 and the outer circumferential frame 314 are formed so as to have the same radial length.

Figure 7:
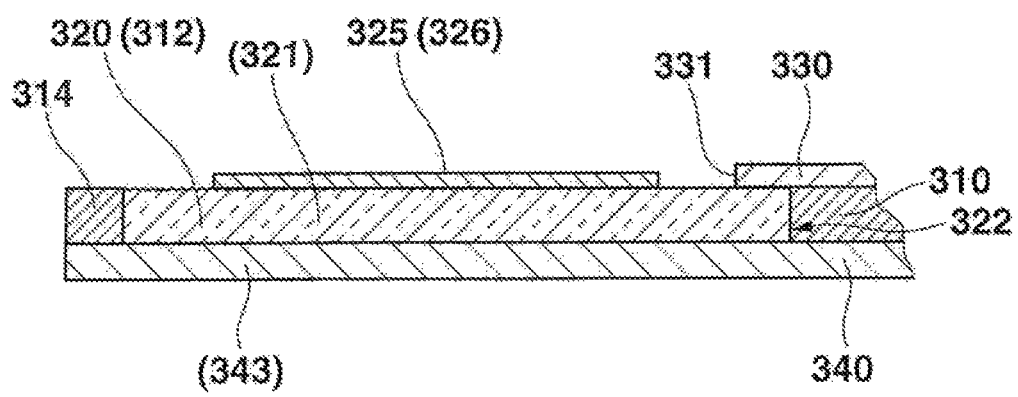
FIG. 7 is a sectional view of the luminescent wheel according to the embodiment of the invention taken along a line VII-VII in FIG. 4.

Next, FIG. 7 shows a sectional view of the luminescent wheel taken along a line VII-VII in FIG. 4. As has been described before, the portions of the back surface of the diffuse plate 320 which lie near the end edges 321 thereof are supported by the portions of the front surface of the back side supporting plate 340 which lie near the end edges 343 of the transmitting portion 341. Further, the luminescent material layer 325 is provided so that portions thereof which lie near the end edges 326 thereof overlap the diffuse plate 320.

Figure 8:
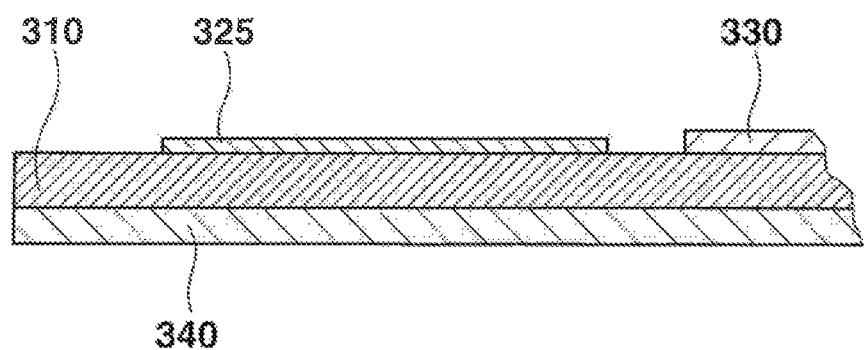
FIG. 8 is a sectional view of the luminescent wheel according to the embodiment of the invention taken along a line VIII-VIII in FIG. 4.

Next, FIG. 8 shows a sectional view of the luminescent wheel taken along a line VIII-VIII in FIG. 4. As has been described before, the luminescent material layer 325 is provided on the reflecting plate 310. Consequently, in luminescent light that is emitted as a result of the luminescent material in the luminescent material layer 325 being excited by excitation light, luminescent light which is emitted to a back side of the luminescent wheel 101 is reflected by the reflecting plate 310 to be emitted to a front side of the luminescent wheel 101.

Thus, while the embodiment of the invention has been described heretofore, the invention is not limited by the embodiment and hence can be carried out in various modes. For example, in the embodiment, while the front side supporting plate 330 is formed of the aluminum material, the front side supporting plate 330 can also be formed of other materials. Similarly, while the back side supporting plate 340 is formed of the stainless steel material, the backside supporting plate 340 can also be formed of other materials.

Figure 9:
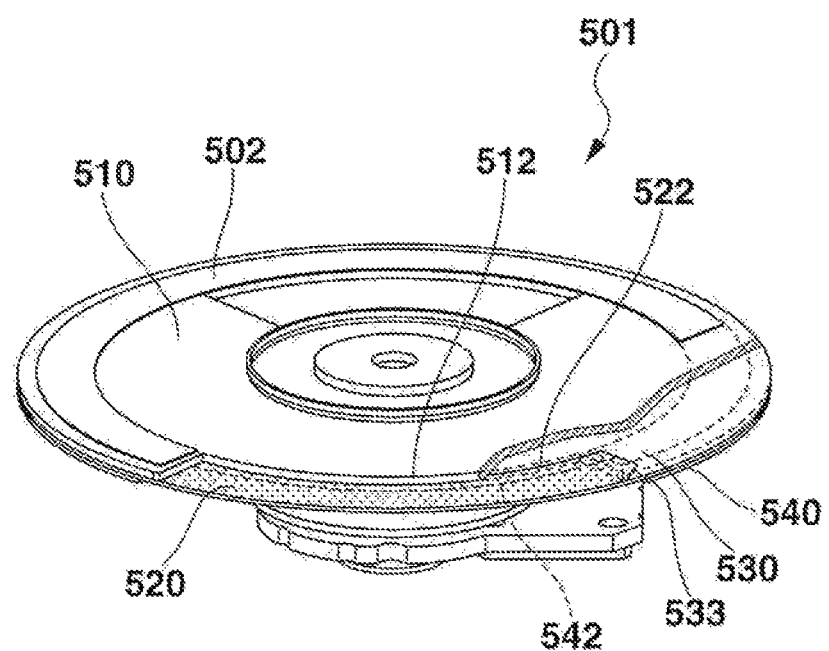
FIG. 9 is a partial sectional view showing a conventional luminescent wheel.

Additionally, in the embodiment, while the diffuse plate 320 is provided in the diffuse plate hole portion 312, as with the conventional luminescent wheel 501 shown in FIG. 9, a configuration may be adopted in which a cut-out portion is formed and the diffuse plate 320 is fastened by claw portions 533 in relation to a centrifugal direction. Similarly, the transmitting portion 341 of the back side supporting plate 340 may be formed as a cut-out portion.

As has been described above, the reflecting plate 310 of the luminescent wheel 101 according to the embodiment of the invention includes the diffuse plate 320 and the luminescent material layer 325 which are provided in the end-to-end relationship with each other in the circumferential direction. The front side supporting plate 330, which is the first supporting plate, is provided on the front side of the reflecting plate 310 which constitutes the one side thereof in such a way as to support part of the diffuse plate 320. The back side supporting plate 340, which is the second supporting plate, is provided on the back side of the reflecting plate 310 which constitutes the other side thereof in such a way as to support another part of the diffuse plate 320.

By adopting this configuration, the front side supporting plate 330 and the luminescent material layer 325 can be provided on the front surface of the reflecting plate 310. Consequently, since the luminescent wheel 101 can be configured as the three-layer construction made up of the front side supporting plate 330 and the luminescent material layer 325, the back side supporting plate 340, and the reflecting plate 310, the thickness of the luminescent wheel 101 can be reduced. Further, since the front side supporting plate 330 and the back side supporting plate 340 should have rigidity which is sufficient to hold the diffuse plate 320 therebetween, both the supporting plates can be formed of a thin plate material, whereby the luminescent wheel 101 can be formed thinner.

Further, the diffuse plate 320 is provided in the diffuse plate hole portion 312 in the reflecting plate 310 on which the luminescent material layer 325 is provided. Consequently, since the surface of the luminescent material layer 325 can be made almost same level with the surface of the diffuse plate 320, the magnitude or intensity of excitation light which is shone on to the luminescent layer 325 is equal to the magnitude or intensity of a pencil of light which is transmitted through the diffuse plate 320 while being diffused, and therefore, it is possible to provide the luminescent wheel 101 which can emit light which is easy to be used when it is used as projection light.

Additionally, the reflecting plate 310 has the circular disc shape. The front side supporting plate 330, which is the first supporting plate, overlaps part of the diffuse light 320 which lies on the inner circumferential edge 322 side thereof to thereby support the diffuse plate 320. This can make the supporting structure from the front side of the diffuse plate 320 simple, thereby making it possible to reduce the diameter of the front side supporting plate 330.

Additionally, the back side supporting plate 340, which is the second supporting plate, overlaps part of the diffuse plate 320 which lies on the inner circumferential edge 322 side thereof to thereby support the diffuse plate 322. This can make the supporting structure from the back side of the diffuse plate 320 simple.

The luminescent material layer 325 has the C-like annular shape, and the end edges 326 of the C-like annular shape are provided on the upper surface of the diffuse plate 320 which constitutes one surface thereof. By adopting this configuration, the gaps between the end edges 321 of the diffuse plate 320 and the circumferential edges of the diffuse plate hole portion 312 are covered by the luminescent material layer 325. Consequently, the luminescent material layer 325 and the diffuse plate 320 can be formed continuously in the circumferential direction.

Additionally, the front side supporting plate 330, which is the first supporting plate, has the circular disc shape. Since this enables the front side supporting plate 330 to be formed into the circular disk shape which provides the good rotating balance, it is possible to drive to rotate the luminescent wheel 101 in a well-balanced fashion.

The back side supporting plate 340, which is the second supporting plate, has the transmitting portion 341. The circumferential end portions of the diffuse plate 320 are supported by the portions of the front surface of the back side supporting plate 340 which lie near the circumferential end edges 343 of the transmitting portion 341 from the back side which is the other side. In fabricating the luminescent wheel 101, the diffuse plate 320 is temporarily placed on the back side supporting plate 340 to perform other fabricating steps, whereby the number of man-hours involved in the fabrication of the luminescent wheel 101 can be reduced.

The front side supporting plate 330, which is the first supporting plate, is formed of the metal containing aluminum such as the aluminum material, and the back side supporting plate 340, which is the second supporting plate, is formed of the metal containing stainless steel such as the stainless steel material. This enables the front side supporting plate 330 to be formed as the light member and the back side supporting member 340 to be formed as the highly rigid member.

The light source unit 60 has the luminescent wheel device 100, the excitation light shining device 70 which emits light in the blue wavelength range, and the red light source device 120 which emits light in the red wavelength range. The luminescent material layer 325 of the luminescent wheel 101 emits light in the green wavelength range as a result of excitation light emitted from the excitation light shining device 70 being shone on thereto. This enables the reduction in size of the luminescent wheel device 100 through the use of the luminescent wheel 101 which is formed thin, and therefore, it is possible to provide the small light source unit 60 which can emit light source lights of the three primary colors.

The projector 10 has the light source unit 60, the display device 51, the projection side optical system 220 and the projector control unit. This makes it possible to obtain the projector 10 which is made smaller in size.

The embodiment that has been described heretofore is provided as the example, and hence, there is no intention of limiting the scope of the invention by the embodiment. The novel embodiment can be carried out in other various forms, and various omissions, replacements and/or modifications can be made thereto without departing from the spirit and scope of the invention. The resulting embodiments or their modifications are contained in the spirit and scope of the invention and are also contained in the scope of inventions which will be claimed hereafter and their equivalents.

What is claimed is:

1. A luminescent wheel comprising:
   a reflecting plate on which a diffuse plate and a luminescent material layer are provided in an end-to-end relationship with each other in a circumferential direction, wherein the reflecting plate has a circular disc shape;
   a first supporting plate which is provided on one surface of the reflecting plate to support part of the diffuse plate; and
   a second supporting plate which is provided on the other surface of the reflecting plate to support the part of the diffuse plate;
   wherein the first supporting plate overlaps an inner circumferential edge side portion of the diffuse plate to support the diffuse plate,
   wherein the second supporting plate overlaps the inner circumferential edge side portion of the diffuse plate to support the diffuse plate, and
   wherein the inner circumferential edge side portion of the diffuse plate is interposed between the first supporting plate and the second supporting plate.

2. The luminescent wheel according to claim 1, wherein the first supporting plate, the diffuse plate, and the second supporting plate all overlap each other only at the inner circumferential edge side portion of the diffuse plate.

3. The luminescent wheel according to claim 1, wherein the luminescent material layer has a C-like annular shape, and an end portion of the C-like annular shape is provided on one surface of the diffuse plate.

4. The luminescent wheel according to claim 2, wherein the luminescent material layer has a C-like annular shape, and an end portion of the C-like annular shape is provided on one surface of the diffuse plate.

5. The luminescent wheel according to claim 1, wherein the first supporting plate has a circular disc shape.

6. The luminescent wheel according to claim 1, wherein the second supporting plate has a transmitting portion which transmits light which is transmitted through the diffuse plate, and
   wherein end portions of the diffuse plate are supported by portions of the second supporting plate lying near both circumferential end portions of the transmitting portion.

7. The luminescent wheel according to claim 1, wherein the first supporting plate is formed of a metal containing aluminum, and the second supporting plate is formed of a metal containing stainless steel.

8. A light source unit comprising:
   a luminescent wheel device comprising the luminescent wheel according to claim 1;
   an excitation light shining device which comprises a semiconductor light emitting element to emit light in the blue wavelength range as excitation light; and a red light source device which comprises a semiconductor light emitting device to emit light in the red wavelength range, wherein the luminescent material layer emits light in the green wavelength range as a result of the excitation light being shone thereon.

9. A projector comprising:

the light source unit according to claim 8;

a display device onto which light source light from the light source unit is shone to form image light;

a projection side optical system which projects the image light emitted from the display device onto a screen; and a projector control unit configured to control the display device and the light source unit.

10. A luminescent wheel comprising:

a reflecting plate on which a diffuse plate and a luminescent material layer are provided in a circumferential direction, wherein the reflecting plate has a circular disc shape;

a first supporting plate which is provided on one surface of the reflecting plate; and a second supporting plate which is provided on the other surface of the reflecting plate, wherein an inner circumferential side portion of the diffuse plate is interposed between the second supporting plate and an outer circumferential edge of the first supporting plate.

11. The luminescent wheel according to claim 10, wherein the second supporting plate has a transmitting portion which transmits light which is transmitted through the diffuse plate, and wherein the inner circumferential side portion of the diffuse plate is held by an inner circumferential edge of the transmitting portion and the outer circumferential edge of the first supporting plate.

12. The luminescent wheel according to claim 10, wherein the luminescent material layer has a C-like annular shape, and an end portion of the C-like annular shape is provided on one surface of the diffuse plate.

13. The luminescent wheel according to claim 11, wherein the luminescent material layer has a C-like annular shape, and an end portion of the C-like annular shape is provided on one surface of the diffuse plate.

14. The luminescent wheel according to claim 10, wherein the first supporting plate has a circular disc shape.

15. The luminescent wheel according to claim 10, wherein the second supporting plate has a transmitting portion which transmits light which is transmitted through the diffuse plate, and wherein end portions of the diffuse plate are supported by portions of the second supporting plate lying near both circumferential end portions of the transmitting portion.

16. The luminescent wheel according to claim 10, wherein the first supporting plate is formed of a metal containing aluminum, and the second supporting plate is formed of a metal containing stainless steel.

17. A light source unit comprising:

a luminescent wheel device comprising the luminescent wheel according to claim 10;

an excitation light shining device which comprises a semiconductor light emitting element to emit light in the blue wavelength range as excitation light; and a red light source device which comprises a semiconductor light emitting device to emit light in the red wavelength range, wherein the luminescent material layer emits light in the green wavelength range as a result of the excitation light being shone thereon.

18. A projector comprising:

the light source unit according to claim 17;

a display device onto which light source light from the light source unit is shone to form image light;

a projection side optical system which projects the image light emitted from the display device onto a screen; and a projector control unit configured to control the display device and the light source unit.

* * * * *